Patented Nov. 30, 1926.

1,608,886

UNITED STATES PATENT OFFICE.

PHILIP ADOLPH KOBER, OF ALBANY, NEW YORK.

PROCESS OF MAKING DIALYZING AND PERVAPORATING MEMBRANES.

No Drawing.   Application filed June 17, 1918. Serial No. 240,468.

This invention relates to improvements in the manufacture and composition of membranes and membrane containers, usable in the well known art of dialyzing and in the known art of pervaporation and percrystallization, described in the Journal of the American Chemical Society, Vol. 39, page 944, (1917), and in the pending application Ser. No. 239,254.

The membranes usually made and used for these arts may be divided into two classes. The first class consists of parchment paper and certain natural membranes. The second class consists of those made from collodion and gelatine and similar solutions. The first class of membranes can be used over and over again, but have the disadvantage of being difficultly shaped into various forms, such as bottles, flasks, tubes, etc. The second class of membranes can be shaped or moulded into almost any form, but collodion containers cannot be used over and over again, while gelatine membranes are too fragile for most purposes.

It is also well known that collodion membranes shrink enormously and become hard and impermeable when subjected to drying in part or in whole.

I observed that gelatine, gellos and gellies in domestic use, although containing much water in their composition do not dry or shrivel up, no matter how long they stand at room temperatures. It therefore occurred to me that if I could make a gel from collodion and gelatine, it would solve the problem, and give us a membrane which could be molded or shaped as desired, which would not shrink and could be used over and over again.

This I succeeded in doing and the membranes made by the method here disclosed, do not shrink and are usable and permeable anew, at once without further treatment, for the purpose of dialyzing and pervaporating.

To make such membranes, I prefer to go about the process as follows:

Thirty grams of collodion are dissolved in 100 grams of glacial acetic acid. Thirty grams of gelatine are dissolved in another 100 grams of the same solvent, glacial acetic acid. Then the two solutions are mixed until homogenous. Other proportions can be also used to advantage, such as 1 part collodion and 3 to 4 parts of gelatine, or 2 parts of collodion and 1 part of gelatine. After thorough mixing, the collodion-gelatine solution is poured into the mould of shape desired, made of glass or any other suitable material. On evaporation of the solvent either by blowing air through the mould or shape, by pressure or by suction or allowing spontaneous evaporation the layer of collodion-gelatine remains as a hard membrane. After removing most of the solvent in the manner indicated the membrane is then treated with water, whereupon the membrane imbibes water and becomes a gel. It is then usable for dialyzing or pervaporation or any other useful purpose.

It was then found that peptones could be substituted for gelatine in this composition and similar results obtained. The collodion-peptone-gel membranes also possess the property of percrystallization, which the collodion-gelatine-gel membranes do not seem to possess. As it will be observed my invention and discovery show that proteins or protein like products or derivatives found in nature or made in the laboratory from porteins by digestion or hydrolysis, may be found suitable to mix with collodion or similar cellulose compounds, which have a common acid solvent. It will be understood therefore, that this invention will not be limited to any particular cellulose or nitro-cellulose compound, nor any particular protein or protein derivative, or digestion or hydrolysis product of protein (all of which have the amino or imino grouping capable of forming acid salts with acids), nor limited to any particular acid solvent, nor the relative amount of solvent used. It is obvious to those skilled in the art that any acid such as butyric acid, if cheap enough could be substituted for acetic acid.

That this method of making membranes allows those skilled in the art of varying the permeability by varying the concentrations of one or the other constituents or both, is obvious from the literature on the subject of membrane permeability, and will be understood to flow from this disclosure.

What is claimed is:

1. A composition for membranes, consisting of nitro-cellulose and a peptone.

2. A permeable membrane consisting of collodion, peptone and water.

3. The process of making permeable membranes, suitable for dialyzing, pervaporating and other industrial purposes, which consists in dissolving nitrocellulose and a peptone in a solvent, and in forming the mixed nitro-cellulose and peptone into a membrane or removal of the solvent.

Signed at Albany, in the county of Albany, State of New York, this 15th day, June, 1918.

PHILIP ADOLPH KOBER.